UNITED STATES PATENT OFFICE.

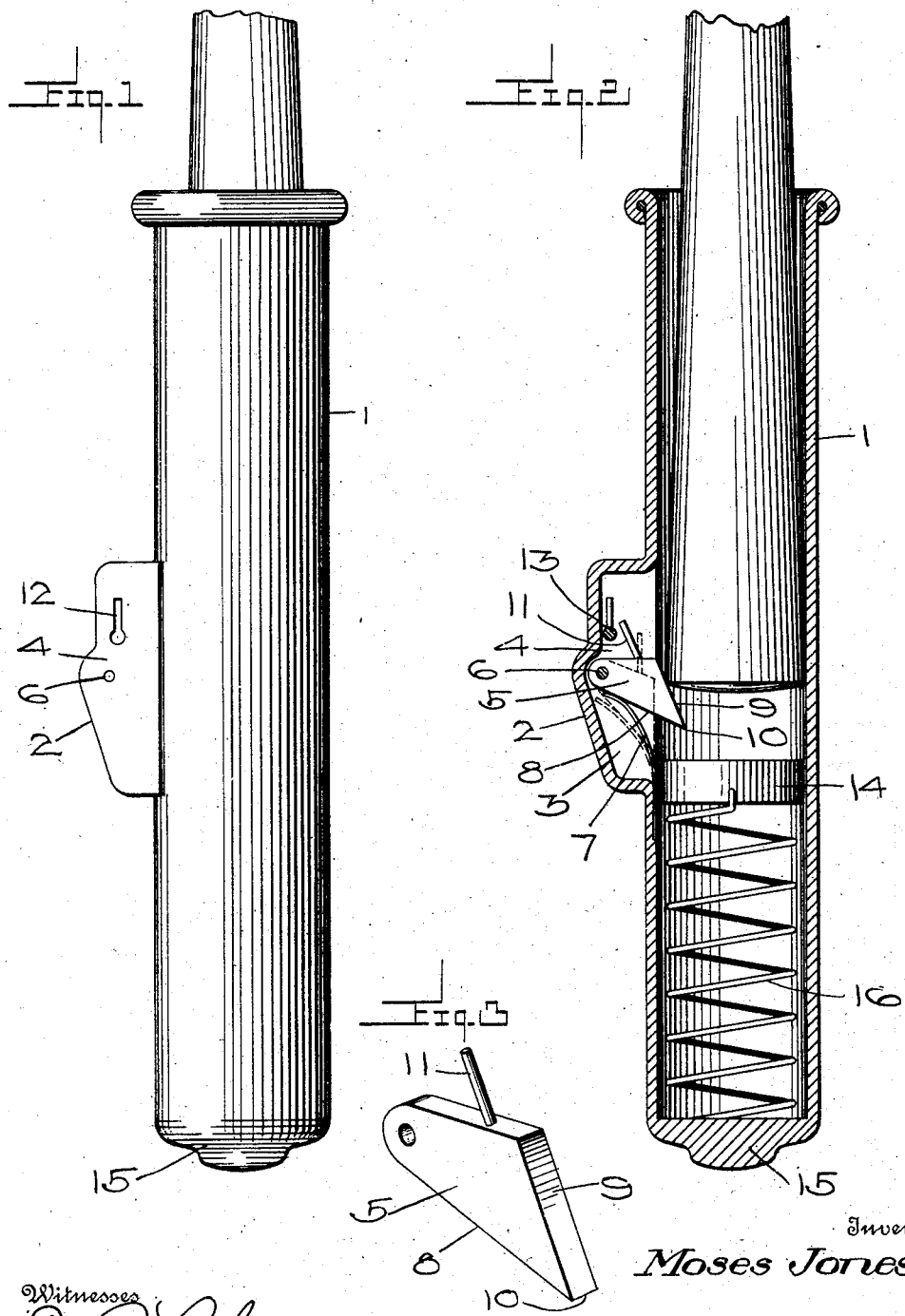

MOSES JONES, JR., OF GREENWICH, NEW JERSEY.

WHIP-SOCKET.

973,941.   Specification of Letters Patent.   Patented Oct. 25, 1910.

Application filed April 15, 1910. Serial No. 555,650.

*To all whom it may concern:*

Be it known that I, MOSES JONES, Jr., a citizen of the United States, residing at Greenwich, in the county of Cumberland and State of New Jersey, have invented certain new and useful Improvements in Whip-Sockets, of which the following is a specification.

This invention relates to improvements in whip sockets, and more particularly to those wherein the whip may be securely locked within the socket against removal therefrom by an unauthorized person.

The object of the invention is to provide a very simple, practical and effective device of the character above described, whereby the whip may be readily inserted within the socket and supported in the usual manner without locking the whip when so desired.

Another object consists in so constructing the socket as to freely receive and support the whip, and by forcing the latter downwardly to the full limit of the socket, the locking device forming a part of said socket, will automatically and securely lock the whip and prevent accidental or other removal of the same from the socket.

A further object derived by the construction of the socket to be hereinafter described, is to provide means for elevating the whip so secured above the locking device when the latter is unlocked or released for subsequent and ready removal of the whip from the socket without further manipulation of the locking device.

Other objects and advantages will be apparent from the following description.

In the drawings: Figure 1 is a side elevation of the complete invention, Fig. 2 is a longitudinal section of the same, Fig. 3 is a perspective view of the dog detached from the socket forming a part of the locking device.

Referring to the drawings, 1 represents a whip socket of suitable design and ornamentation and constructed preferably from metal, but it is obvious that other material may be employed in its construction without departing from the nature of the invention.

The socket 1 is provided with an enlarged portion 2, which is located at a suitable distance along its length and is provided with a cavity 3, which opens within the socket, as clearly shown in Fig. 2 of the drawings, which socket is adapted to receive the movable parts and connections comprising the locking device employed in carrying out the invention.

Pivotally secured within the socket adjacent to the oppositely located side walls 4 of the same is a dog 5, by means of a pin 6 passing through the opposite walls forming the socket and through the dog 5 adjacent to its inner confined ends, said dog being permitted to freely move up and down within the socket.

Fixed to the socket 1 immediately below the cavity 3 formed therein is one end of a flat or leaf spring 7, the opposite or free end of which is located within said cavity and is in yielding contact with the under inclined surface 8 of the dog 5 for holdng the latter in an elevated and supporting position for the purpose previously described. The inner inclined engaging surface 9 of the dog 5 forms a resting surface for the lower end of the whip handle when the latter is unlocked within the whip socket and forms a riding surface for said handle of the whip when the latter is in a position within the socket to be forced downwardly, in which operation the biting edge 10 formed by the lower inclined surface and the riding surface 9 of the dog 5, will come in contact with the whip handle and prevent removal of the whip from the socket until the dog has been depressed sufficiently by the mechanism hereinafter to be described, to move the biting edge out of contact with the handle of the whip.

Secured to the upper flat surface of the dog 5 and projecting upwardly therefrom is a pin 11, which is located in such a position in respect to the dog 5 as not to interfere or come in contact with the whip handle when the latter is forced downwardly within the socket.

Formed in the enlarged portion 2 of the socket above the cavity 3 formed therein is a key receiving opening 12, which is adapted to receive an ordinary key 13, the wing of which is adapted to be brought in contact with the upper end of the pin 11 when the same is turned toward the said pin, whereby the dog 5 is depressed sufficiently to release its hold or grip upon the handle of the whip for releasing the same for removal of said whip from the socket.

Normally located immediately below the dog 5, when the latter is in its elevated position, is a seat 14, which is of sufficient size to freely move within the socket, and located within the latter and disposed between the bottom 15 of the socket and said seat, is a coil spring 16, which causes the seat to assume an elevated and operative position in respect to the dog, and upon which the lower end of the handle of the whip is adapted to be seated.

From the foregoing description it will be seen that when the parts comprising the invention are in their normal position, the dog 5 will be in an elevated or supporting position and projecting a suitable distance within the socket, and the seat 14 also in an elevated position by reason of the confined spring 16, whereby when a whip is inserted in the ordinary manner within the socket the lower end of the handle thereof will rest upon the dog 5. Should it be desired to lock the whip within the socket the same is forced downwardly, causing the dog 5 to be moved within the cavity 3, in which operation the lower end of the whip handle will come in contact with the seat 14 and compress the spring 16 within the socket, the whip being prevented from moving upwardly within the socket by the dog 5, the biting edge 10 of which will be in yielding but in a gripping position to firmly and securely hold the whip within the socket. When it is desired to remove the whip from the socket after it has been locked in a manner previously described, a key is inserted into the key opening 12 of the socket, and the same turned in the usual manner to bring its wing in contact with the upper end of the pin 11, in which operation the dog 5 is slightly but further depressed sufficiently to release the biting edge 10 from its engagement with the handle of the whip, and while the dog is in this position the compressed spring 16 will automatically elevate the whip a sufficient height within the socket to cause the lower end of the handle portion thereof to be located above the dog 5 after the latter assumes its normal or supporting position.

In carrying out my invention it is to be observed that any desired or well known key may be employed to operate the locking device herein described without departing from the nature of the invention, the principal object being to provide a socket which is adapted to freely receive the whip handle in the usual manner, but supported by the locking device forming a part of the socket when it is not desired to lock the whip, the said locking device and parts accompanying the same being so devised, located and constructed, as to be operated by forcing the whip downwardly within the socket, in which operation the said whip is secured against removal by unauthorized persons, a key being necessary for releasing the locking device and for the subsequent removal of the whip from the socket.

What is claimed is:

1. A whip socket comprising an angular pivoted dog located within a suitable cavity formed in the socket, said dog having an inclined whip supporting surface, and a biting nose, means for holding said dog in an elevated position with its end projecting into the socket for primarily supporting the whip handle and also for locking the latter, a seat located within the socket below the locking device, a coil spring disposed between said seat and the bottom of the socket for causing said seat to assume an elevated position and means for releasing the locking device, said seat adapted to be forced upward by the spring to engage the side face of the whip with the said biting nose.

2. In combination with a whip socket having a cavity formed therein, an angular pivoted dog located within said cavity adjacent its upper wall, the outer end of said dog projecting a sufficient distance within the socket, said dog having an inclined riding surface and a lower inclined surface forming a biting edge, said inclined riding surface adapted to support the handle of a whip, a pin secured to the dog and projecting angularly upward therefrom, a seat movably located within the socket below the dog, a coil spring disposed between said seat and the bottom of the socket for holding the former in an elevated position, said seat adapted to force the said whip upward into engagement with said biting edge, a leaf spring secured within the socket and having its free end projecting into the cavity of the socket and in contact with the under inclined surface of the dog adjacent to its pivotal connection, and suitable means for releasing or depressing the dog and adapted to be brought in contact with the upper end of the pin carried by the latter.

3. In combination with a whip socket having a cavity formed therein, an angular pivoted dog, one end of which is located adjacent the outer wall of said cavity, said dog having an inclined contacting surface projecting into the socket and a terminal biting edge, a pin projecting angularly upward therefrom and normally located within the cavity, a seat movably located within the socket below the dog, a coil spring disposed between said seat and bottom of the socket for holding the former in an elevated position in respect to the lower biting edge of the dog, a leaf spring secured within the socket adjacent the lower end of the cavity of the socket and having its upper free end in yielding contact with the under inclined surface of the dog adjacent its pivotal connection, one wall of said cavity having an opening therethrough, and suitable means adapted to be inserted through said opening for releasing or depressing the dog and adapted to be brought in contact with the upper end of the inclined pin carried by the dog, whereby the lower end of the whip handle is normally held in an elevated position within the socket above the yielding seat located below the locking device.

In testimony whereof I affix my signature, in presence of two witnesses.

MOSES JONES, JR.

Witnesses:
SAMUEL M. SHELDON,
ROBT. T. SCHILLER.